US012608929B2

(12) United States Patent
Matsui et al.

(10) Patent No.: US 12,608,929 B2
(45) Date of Patent: Apr. 21, 2026

(54) INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

(71) Applicant: PANASONIC INTELLECTUAL PROPERTY MANAGEMENT CO., LTD., Osaka (JP)

(72) Inventors: Satoshi Matsui, Kyoto (JP); Tadamasa Toma, Osaka (JP); Minami Naka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/024,948

(22) Filed: Jan. 16, 2025

(65) Prior Publication Data

US 2025/0157212 A1 May 15, 2025

Related U.S. Application Data

(63) Continuation of application No. PCT/JP2023/025799, filed on Jul. 12, 2023.
(Continued)

(30) Foreign Application Priority Data

Jun. 19, 2023 (JP) ................................. 2023-100246

(51) Int. Cl.
*H04N 5/00* (2011.01)
*G06T 7/73* (2017.01)
(Continued)

(52) U.S. Cl.
CPC .............. *G06V 10/987* (2022.01); *G06T 7/73* (2017.01); *G06V 20/50* (2022.01); *G06T 2207/30204* (2013.01)

(58) Field of Classification Search
USPC ....................................................... 348/143
See application file for complete search history.

(56) References Cited

U.S. PATENT DOCUMENTS

2019/0343478 A1* 11/2019 Sørensen ............. A61B 6/4085
2019/0362480 A1* 11/2019 Diao ......................... G06T 7/10
2019/0362486 A1* 11/2019 Diao ..................... G06T 7/0004

FOREIGN PATENT DOCUMENTS

JP 2021-150866 9/2021

OTHER PUBLICATIONS

International Search Report (ISR) from International Searching Authority (Japan Patent Office) in International Pat. Appl. No. PCT/JP2023/025799, dated Sep. 26, 2023, together with an English language translation.

* cited by examiner

*Primary Examiner* — Nigar Chowdhury
(74) *Attorney, Agent, or Firm* — Greenblum & Bernstein, P.L.C.

(57) ABSTRACT

An image processing device acquires an image captured by a camera, recognizes a plurality of markers included in the image, calculates a distance between each of the plurality of markers that are recognized, identifies a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated, creates
(Continued)

a mask image in which an area outside the first capturable area and the second capturable area in the image is masked, and outputs the mask image.

11 Claims, 7 Drawing Sheets

Related U.S. Application Data

(60) Provisional application No. 63/368,924, filed on Jul. 20, 2022.

(51) Int. Cl.
     *G06V 10/98*      (2022.01)
     *G06V 20/50*      (2022.01)

INFORMATION PROCESSING METHOD, INFORMATION PROCESSING DEVICE, AND NON-TRANSITORY COMPUTER READABLE RECORDING MEDIUM STORING INFORMATION PROCESSING PROGRAM

FIELD OF INVENTION

The present disclosure relates to a technique of masking an area other than a plurality of capturable areas in an image.

BACKGROUND ART

For example, Patent Literature 1 discloses a video control device in which a work area is set with a capturable area in which video sharing with a remote support worker is permitted, and a masking video in which a work area that is not the capturable area is masked is transmitted to a remote terminal for the remote support worker. A conventional video control device detects a marker included in video data, extracts marker information indicating a capturable area from the detected marker, determines a video area determined to be outside the capturable area in the video data as an unshareable video area, and masks the unshareable video area to generate a masked video.

However, in the above-described conventional technique, setting of a plurality of capturable areas is not taken into consideration, and it is difficult to output an image in which an area other than a plurality of capturable areas is appropriately masked, and further improvement has been required.

Patent Literature 1: JP 2021-150866 A

SUMMARY OF THE INVENTION

The present disclosure has been made to solve the above problem, and an object of the present disclosure is to provide a technique capable of outputting an image in which an area other than a plurality of capturable areas is appropriately masked even in a case where a plurality of capturable areas are set.

An information processing method according to the present disclosure is an information processing method in a computer, the information processing method including acquiring an image captured by a camera, recognizing a plurality of markers included in the image, calculating a distance between each of the plurality of markers that are recognized, identifying a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated, creating a mask image in which an area outside the first capturable area and the second capturable area in the image is masked, and outputting the mask image.

According to the present disclosure, even in a case where a plurality of capturable areas are set, it is possible to output an image in which an area other than a plurality of capturable areas is appropriately masked.

DETAILED DESCRIPTION

Knowledge Underlying Present Disclosure

Figure 1:
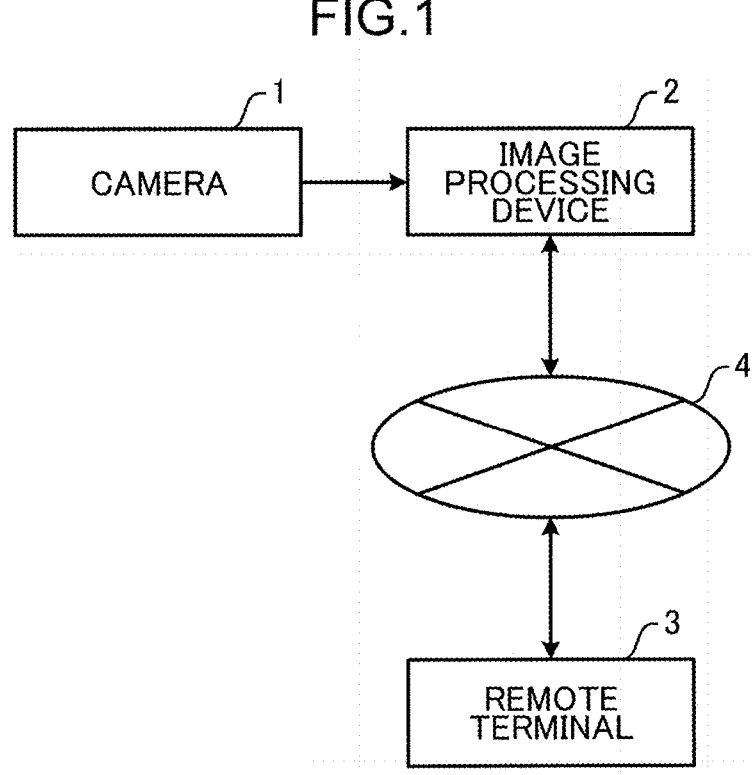
FIG. 1 is a diagram illustrating an example of a configuration of a work support system according to an embodiment of the present disclosure.

In order for a worker in a site to efficiently receive business support from a worker in a remote place, it is effective to share a video capturing a situation at the site with the worker in the remote place.

When a video is transmitted to a remote place, there is a possibility that confidential information appears in the video. In view of the above, in order to prevent confidential information from being leaked to the outside by video transmission, processing of identifying an object for which video transmission is possible or an object that is confidential information and masking an area corresponding to confidential information in a video is performed.

For example, a worker in a site arranges a plurality of markers in a manner surrounding an area that can be transmitted via video, that is, an area not including confidential information. A plurality of markers in a captured video are recognized, and an area outside a capturable area surrounded by a plurality of recognized markers is masked, so that it is possible to prevent confidential information from leaking.

Here, at a site, there is a demand for setting not only one capturable area but also a plurality of capturable areas and transmitting a video in which a work area other than a plurality of capturable areas is masked to a remote place. For example, in a case where two capturable areas are set, four markers of different types are set as one marker group, and two marker groups are used.

However, the conventional device cannot determine which combination of four markers is one marker group only by performing image recognition on eight markers. For example, even if four markers out of eight markers are recognized by image recognition, there is a possibility that the four markers are not a combination intended by a worker.

This problem can be handled by determining in advance a condition of a type and an arrangement position of four markers belonging to one marker group and not recognizing a combination other than a combination of the four markers arranged under the determined condition. However, in a case where a plurality of marker groups are included in an image, there is a possibility that an unintended combination of four markers satisfies a predetermined condition, mask processing is not appropriately performed, and a video including confidential information is transmitted.

In the above-described conventional technique, setting of a plurality of capturable areas is not considered, and it is difficult to output an image in which an area other than a plurality of capturable areas is appropriately masked.

To solve the above problems, a technique below is disclosed.

(1) An information processing method according to one aspect of the present disclosure is an information processing method in a computer, the information processing method including acquiring an image captured by a camera, recognizing a plurality of markers included in the image, calculating a distance between each of the plurality of markers that are recognized, identifying a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated, creating a mask image in which an area outside the first capturable area and the second capturable area in the image is masked, and outputting the mask image.

According to this configuration, in a case where a plurality of markers included in an image are recognized, a distance between each of a plurality of recognized markers is calculated. Then, based on the calculated distance, the first capturable area surrounded by a predetermined number of markers belonging to the first marker group among a plurality of recognized markers and the second capturable area surrounded by a predetermined number of markers belonging to the second marker group among a plurality of recognized markers are identified. Then, a mask image in which an area outside the first capturable area and the second capturable area in the image is masked is created, and the mask image is output.

Therefore, even in a case where a plurality of capturable areas are set, each of a plurality of capturable areas is identified, so that it is possible to output an image in which an area other than a plurality of capturable areas is appropriately masked. That is, it is possible to prevent the first capturable area and the second capturable area from being erroneously identified as one capturable area, and to prevent an image including confidential information in one capturable area that is erroneously identified from being output. As a result, a worker in a site can receive efficient work support from a worker in a remote place.

(2) In the information processing method according to (1) above, in identifying the first capturable area and the second capturable area, the first marker group including the predetermined number of markers between which the distance is equal to or less than a threshold and the second marker group including the predetermined number of markers between which the distance is equal to or less than a threshold may be identified.

According to this configuration, in a case where a distance between a predetermined number of markers is equal to or less than a threshold, the predetermined number of markers can be determined to belong to the same marker group. Therefore, it is possible to identify a predetermined number of markers of a correct combination belonging to the first marker group and a predetermined number of markers of a correct combination belonging to the second marker group.

(3) In the information processing method according to (1) or (2) above, in identifying the first capturable area and the second capturable area, in a case where a plurality of markers of a same type exist, a marker with the distance closest from a marker as a reference may be identified as a marker belonging to a same marker group as the marker as the reference.

According to this configuration, in a case where a plurality of markers of the same type exist, a marker at a closest distance from a reference marker is identified as a marker belonging to the same marker group as the reference marker. Therefore, it is possible to more reliably identify a predetermined number of markers of a correct combination belonging to the first marker group and a predetermined number of markers of a correct combination belonging to the second marker group.

(4) In the information processing method according to any one of (1) to (3) above, a positional relationship between the predetermined number of markers belonging to each of the first marker group and the second marker group may be determined in advance, and the information processing method may further include determining whether or not the predetermined number of markers are arranged according to the positional relationship determined in advance in a case of recognizing the plurality of markers first, and outputting notification information for notifying a worker that a positional relationship between the predetermined number of markers is incorrect in a case of determining that the predetermined number of markers are not arranged according to the positional relationship determined in advance.

For example, a plurality of markers are attached to a work area by a worker. For this reason, there is a possibility that a marker is attached in a wrong positional relationship due to an error of a worker. In this case, it is difficult to identify the first capturable area and the second capturable area. However, according to the above configuration, in a case where a predetermined number of markers are determined not to be arranged according to a predetermined positional relationship, notification information for notifying a worker that a positional relationship between a predetermined number of markers is incorrect is output. Therefore, it is possible to notify a worker that a predetermined number of markers are arranged in an incorrect positional relationship, and it is possible to prompt a worker to rearrange a predetermined number of markers in a correct positional relationship.

(5) In the information processing method according to any one of (1) to (3) above, a positional relationship between the predetermined number of markers belonging to each of the first marker group and the second marker group may be determined in advance, and the information processing method may further include determining whether or not the predetermined number of markers are arranged according to the positional relationship determined in advance in a case of recognizing the plurality of markers first, and outputting notification information for notifying a worker of a marker not arranged according to the positional relationship determined in advance in a case of determining that the predetermined number of markers are not arranged according to the positional relationship determined in advance.

For example, a plurality of markers are attached to a work area by a worker. For this reason, there is a possibility that a marker is attached in a wrong positional relationship due to an error of a worker. In this case, it is difficult to identify the first capturable area and the second capturable area. However, according to the above configuration, in a case where a predetermined number of markers are determined not to be arranged according to a predetermined positional relationship, notification information for notifying a worker of a marker that is not arranged according to a predetermined positional relationship is output. Therefore, a marker arranged in an incorrect positional relationship can be notified to a worker, and a worker can be prompted to rearrange a marker arranged in an incorrect positional relationship in a correct positional relationship.

(6) The information processing method according to (4) above may further include receiving input by the worker about a number of a plurality of marker groups to be used and a number of the predetermined number of markers belonging to each marker group, and determining whether or not the plurality of markers, a number of which is same as a number of all markers belonging to the plurality of marker groups that are input, are recognized in a case of recognizing the plurality of markers first, in which in determining whether or not the predetermined number of markers are arranged according to the positional relationship determined in advance, in a case where the plurality of markers, a number of which is same as a number of all markers belonging to each of the plurality of marker groups that are input, are determined to be recognized, whether or not the predetermined number of markers are arranged according to the positional relationship determined in advance may be determined.

According to this configuration, input by a worker about the number of a plurality of marker groups to be used and the number of a predetermined number of markers belonging to each marker group is received, and in a case where a plurality of markers are recognized first, whether or not a plurality of markers, the number of which is the same as the number of all markers belonging to the plurality of marker groups that is input, are recognized is determined.

Therefore, first, whether or not the number of a plurality of markers recognized is the same as the number of a plurality of markers actually arranged is determined, so that whether or not all of a plurality of markers actually arranged are recognized is automatically determined.

(7) The information processing method according to (4) above may further include presenting the image that is acquired to the worker in a case where the plurality of markers are first recognized, and receiving input by the worker as to whether or not all markers belonging to a plurality of marker groups are recognized in the image, in which in determining whether or not the predetermined number of markers are arranged according to the positional relationship determined in advance, in a case where the worker inputs that all the markers belonging to the marker groups are recognized, whether or not the predetermined number of markers are arranged according to the positional relationship determined in advance may be determined.

According to this configuration, in a case where a plurality of markers are first recognized, an acquired image is presented to a worker, and input by a worker as to whether or not all markers belonging to a plurality of marker groups are recognized in an image is received.

Therefore, it is possible to cause a worker to check whether or not all of a plurality of markers actually arranged are recognized.

(8) In the information processing method according to any one of (1) to (7) above, the predetermined number of markers belonging to the first marker group may include a first marker arranged at an upper left position, a second marker arranged at a lower left position, a third marker arranged at an upper right position, and a fourth marker arranged at a lower right position in a first work area that is capturable in a work space, and the predetermined number of markers belonging to the second marker group may include a fifth marker arranged at an upper left position, a sixth marker arranged at a lower left position, a seventh marker arranged at an upper right position, and an eighth marker arranged at a lower right position in a second work area that is capturable in the work space.

According to this configuration, the first capturable area surrounded by the first marker arranged at the upper left position of the first work area, the second marker arranged at the lower left position of the first work area, the third marker arranged at the upper right position of the first work area, and the fourth marker arranged at the lower right position of the first work area, and the second capturable area surrounded by the fifth marker arranged at the upper left position of the second work area, the sixth marker arranged at the lower left position of the second work area, the seventh marker arranged at the upper right position of the second work area, and the eighth marker arranged at the lower right position of the second work area are identified.

Therefore, it is possible to output an image in which an area other than the quadrangular first capturable area and the quadrangular second capturable area is masked.

(9) In the information processing method according to (8) above, in identifying the first capturable area and the second capturable area, in a case where there are the second marker and the sixth marker below the first marker, the second marker closer to the first marker and with a distance to the first marker equal to or less than a threshold may be determined as a marker belonging to the first marker group, in a case where there are the third marker and the seventh marker on a right side of the first marker, the third marker closer to the first marker and with a distance to the first marker equal to or less than a threshold may be determined as a marker belonging to the first marker group, in a case where there are the fourth marker and the eighth marker on the right side of the second marker, the fourth marker closer to the second marker and with a distance to the second marker equal to or less than a threshold may be determined as a marker belonging to the first marker group, and in a case where there are the fourth marker and the eighth marker below the third marker, the fourth marker closer to the third marker and with a distance to the third marker equal to or less than a threshold may be determined as a marker belonging to the first marker group.

According to this configuration, in a case where there are the second marker and the sixth marker below the first marker, the second marker can be determined as a marker belonging to the first marker group, in a case where there are the third marker and the seventh marker on the right side of the first marker, the third marker can be determined as a marker belonging to the first marker group, in a case where there are the fourth marker and the eighth marker on the right side of the second marker, the fourth marker can be determined as a marker belonging to the first marker group, and in a case where there are the fourth marker and the eighth marker below the third marker, the fourth marker can be determined as a marker belonging to the first marker group.

Further, the present disclosure can be implemented not only as an information processing method for executing the characteristic processing as described above, but also as an information processing device or the like having a characteristic configuration corresponding to characteristic processing executed by the information processing method. Further, the present disclosure can also be implemented as a computer program that causes a computer to execute characteristic processing included in the information processing method described above. Therefore, even in another aspect below, an effect as in the above information processing method can be achieved.

(10) An information processing device according to another aspect of the present disclosure includes an acquisition part that acquires an image captured by a camera, a recognition part that recognizes a plurality of markers included in the image, a calculation part that calculates a distance between each of the plurality of markers that are recognized, an identification part that identifies a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated, a creation part that creates a mask image in which an area outside the first capturable area and the second capturable area in the image is masked, and an output part that outputs the mask image.

(11) An information processing program according to another aspect of the present disclosure causes a computer to function to acquire an image captured by a camera, recognize a plurality of markers included in the image, calculate a distance between each of the plurality of markers that are recognized, identify a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated, create a mask image in which an area outside the first capturable area and the second capturable area in the image is masked, and output the mask image.

(12) A non-transitory computer readable recording medium according to another aspect of the present disclosure records an information processing program, and the information processing program causes a computer to function to acquire an image captured by a camera, recognize a plurality of markers included in the image, calculate a distance between each of the plurality of markers that are recognized, identify a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated, create a mask image in which an area outside the first capturable area and the second capturable area in the image is masked, and output the mask image.

Hereinafter, an embodiment of the present disclosure will be described with reference to the accompanying drawings. Note that each of embodiments to be described below shows one specific example of the present disclosure. Numerical values, shapes, constituent elements, steps, order of steps, and the like of the embodiment below are merely examples, and do not intend to limit the present disclosure. Further, a constituent element not described in an independent claim representing a highest concept among constituent elements in the embodiments below is described as an optional constituent element. Further, in all the embodiments, content of each of the embodiments can be combined.

Embodiment

FIG. 1 is a diagram illustrating an example of a configuration of a work support system according to an embodiment of the present disclosure. The work support system illustrated in FIG. 1 includes a camera 1, an image processing device 2, and a remote terminal 3.

The camera 1 is, for example, a wearable camera mounted on the head of a worker at a site. The worker wears the camera 1 and performs work. At this time, the worker in the site receives business support from a worker in a remote place while capturing a support target device in a work space in the site with the camera 1. The worker in the remote place provides support for operation, repair, and the like of the support target device while viewing an image transmitted from the site.

Figure 2:
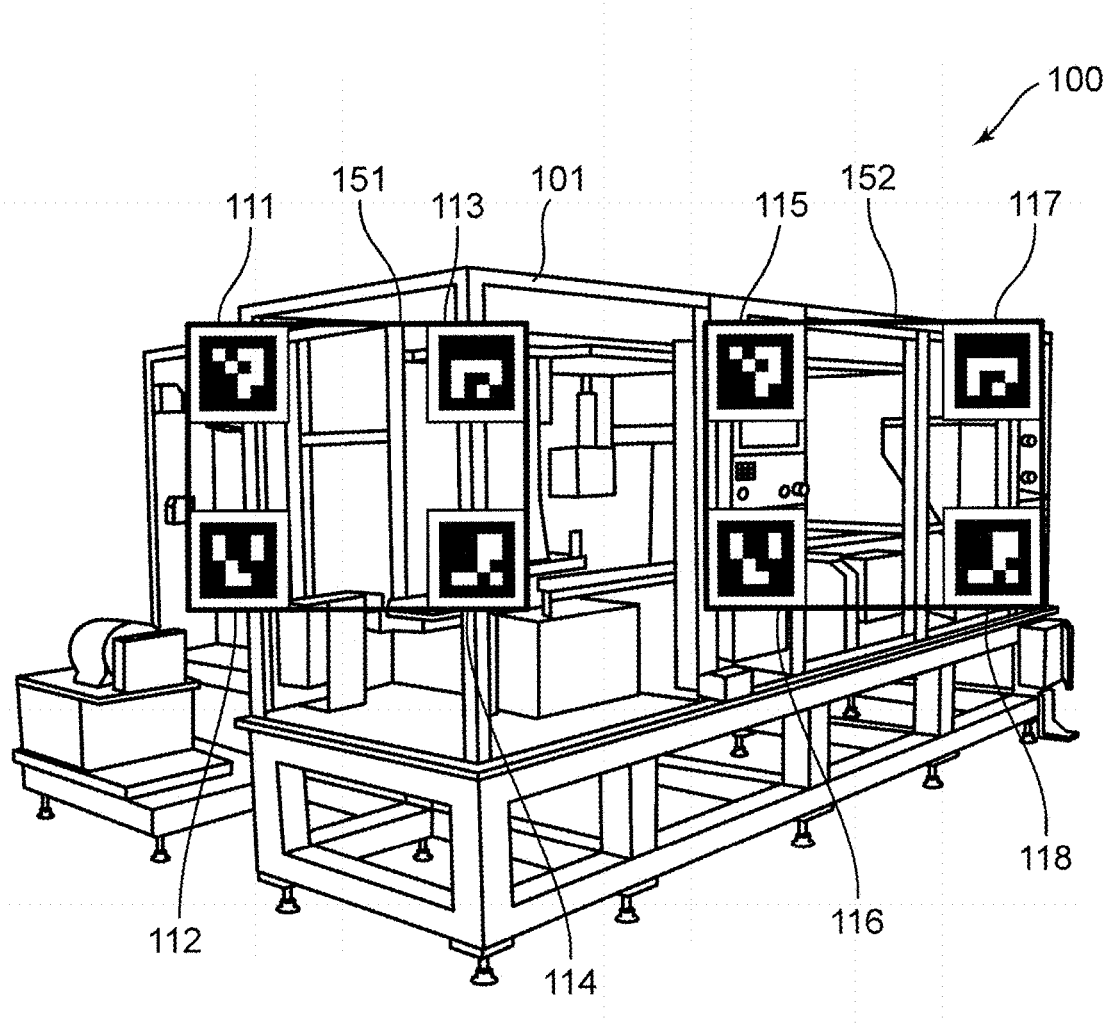
FIG. 2 is a diagram illustrating an example of a work space in the present embodiment.
Figure 2:
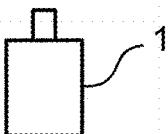

FIG. 2 is a diagram illustrating an example of a work space in the present embodiment.

As illustrated in FIG. 2, a support target device 101 is installed in a work space 100. A worker at a site captures an image of the support target device 101 by using the camera 1. The image captured by the camera 1 is transmitted to the remote terminal 3 operated by a worker in a remote place. At this time, there is a possibility that confidential information appears in the captured image. In view of the above, in order to prevent an image including confidential information from being transmitted, a portion other than a specific work area is hidden by image processing (mask processing). In the present embodiment, there are not only one work area that is capturable and does not include confidential information but also a plurality of such work areas. A worker at a site attaches a first marker 111 to an eighth marker 118 in a manner surrounding each of a first work area 151 and a second work area 152 not including confidential information of the support target device 101. The first marker 111 to the eighth marker 118 are directly attached in a manner surrounding each of the first work area 151 and the second work area 152 which are capturable by, for example, an adhesive substance, a magnet, or the like.

The camera 1 transmits a captured image to the image processing device 2 by short range wireless communication. The camera 1 transmits an image to the image processing device 2 at a predetermined frame rate. For this reason, a moving image is transmitted from the camera 1 to the image processing device 2. Note that the camera 1 is wirelessly connected to the image processing device 2, but may be connected to the image processing device 2 via wired connection.

Note that the camera 1 may be a terminal with a camera such as a smartphone or a tablet computer. Further, the camera 1 may be a digital camera.

The image processing device 2 is, for example, a personal computer operated by a worker at a site. The image processing device 2 is connected to the remote terminal 3 via a network 4 so as to be able to communicate with each other. The network 4 is the Internet, for example.

Figure 3:
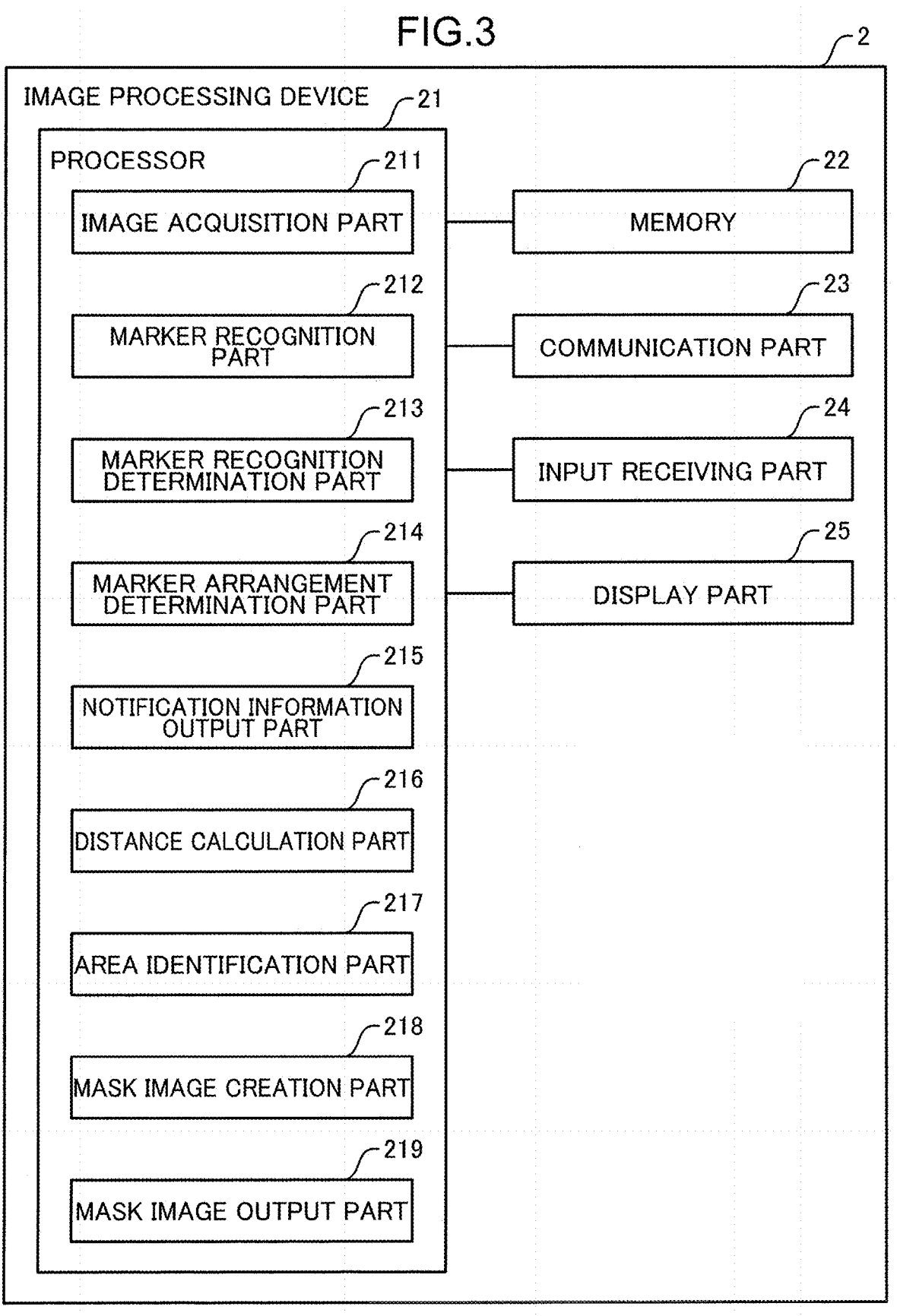
FIG. 3 is a diagram illustrating an example of a configuration of an image processing device according to the present embodiment.

FIG. 3 is a diagram illustrating an example of a configuration of the image processing device 2 according to the present embodiment.

The image processing device 2 illustrated in FIG. 3 includes a processor 21, a memory 22, a communication part 23, an input receiving part 24, and a display part 25.

The processor 21 is a central processing unit (CPU), for example. The processor 21 realizes an image acquisition part 211, a marker recognition part 212, a marker recognition determination part 213, a marker arrangement determination part 214, a notification information output part 215, a distance calculation part 216, an area identification part 217, a mask image creation part 218, and a mask image output part 219.

The memory 22 is a storage device that can store various types of information, such as a random access memory (RAM), a hard disk drive (HDD), a solid state drive (SSD), or a flash memory.

Note that the image processing device 2 corresponds to an example of an information processing device, the image acquisition part 211 corresponds to an example of an acquisition part, the marker recognition part 212 corresponds to an example of a recognition part, the distance calculation part 216 corresponds to an example of a calculation part, the area identification part 217 corresponds to an example of an identification part, the mask image creation part 218 corresponds to an example of a creation part, and the mask image output part 219 corresponds to an example of an output part.

The communication part 23 receives an image transmitted by the camera 1. The communication part 23 outputs a received image to the processor 21. The communication part 23 receives a moving image transmitted at a predetermined frame rate, and outputs an image to the processor 21 for each frame.

The image acquisition part 211 acquires an image captured by the camera 1. The image acquisition part 211 acquires an image for each frame.

The marker recognition part 212 recognizes a plurality of markers included in an image acquired by the image acquisition part 211. In the present embodiment, two marker groups are used. A first marker group includes a predetermined number of different types of markers. The predetermined number is, for example, four. The first marker group includes the first marker 111, the second marker 112, the third marker 113, and the fourth marker 114. A second marker group includes a predetermined number of different types of markers. The predetermined number is, for example, four. The second marker group includes the fifth marker 115, the sixth marker 116, the seventh marker 117, and the eighth marker 118. As illustrated in FIG. 2, eight of the first to eighth markers 111 to 118 have rectangular shapes, the first to fourth markers 111 to 114 have different patterns, and the fifth to eighth markers 115 to 118 have different patterns. The first marker 111 and the fifth marker 115 are of the same type (pattern), the second marker 112 and the sixth marker 116 are of the same type (pattern), the third marker 113 and the seventh marker 117 are of the same type (pattern), and the fourth marker 114 and the eighth marker 118 are of the same type (pattern).

A positional relationship between a predetermined number of markers belonging to each of the first marker group and the second marker group is determined in advance.

A predetermined number of markers belonging to the first marker group include the first marker 111 arranged at an upper left position, the second marker 112 arranged at a lower left position, the third marker 113 arranged at an upper right position, and the fourth marker 114 arranged at a lower right position in the first work area 151 that is capturable in a work space. Further, a predetermined number of markers belonging to the second marker group include the fifth marker 115 arranged at an upper left position, the sixth marker 116 arranged at a lower left position, the seventh marker 117 arranged at an upper right position, and the eighth marker 118 arranged at a lower right position in the second work area 152 that is capturable in a work space.

A worker at a site attaches the first marker 111 on the upper left of the first work area 151 that is capturable, attaches the second marker 112 on the lower left of the first work area 151 that is capturable, attaches the third marker 113 on the upper right of the first work area 151 that is capturable, and attaches the fourth marker 114 on the lower right of the first work area 151 that is capturable. A worker at a site attaches the fifth marker 115 on the upper left of the second work area 152 that is capturable, attaches the sixth marker 116 on the lower left of the second work area 152 that is capturable, attaches the seventh marker 117 on the upper right of the second work area 152 that is capturable, and attaches the eighth marker 118 on the lower right of the second work area 152 that is capturable.

By the above, the first marker 111 is arranged at the upper left of the first work area 151 that is capturable, the second marker 112 is arranged at the lower left of the first work area 151 that is capturable, the third marker 113 is arranged at the upper right of the first work area 151 that is capturable, and the fourth marker 114 is arranged at the lower right of the first work area 151 that is capturable. The fifth marker 115 is arranged at the upper left of the second work area 152 that is capturable, the sixth marker 116 is arranged at the lower left of the second work area 152 that is capturable, the seventh marker 117 is arranged at the upper right of the second work area 152 that is capturable, and the eighth marker 118 is arranged at the lower right of the second work area 152 that is capturable.

The marker recognition part 212 recognizes eight of the first to eighth markers 111 to 118 included in an image by pattern matching. That is, the marker recognition part 212 recognizes eight of the first to eighth markers 111 to 118 in an image by collating patterns of a plurality of markers stored in advance in the memory 22 with patterns of eight of the first to eighth markers 111 to 118 included in the image.

Note that the marker recognition part 212 can recognize not only a marker captured from the front but also a marker captured from an oblique direction.

Further, in the present embodiment, two marker groups are used, but the present disclosure is not particularly limited to this, and three or more marker groups may be used. Further, in the present embodiment, one marker group includes four markers, but the present disclosure is not particularly limited to this, and may include three markers or may include five or more markers.

The input receiving part 24 is, for example, a keyboard, a mouse, or a touch panel. The input receiving part 24 receives worker's input of the number of marker groups to be used and the number of predetermined number of markers belonging to each marker group. The memory 22 stores the number of marker groups to be used and the number of a predetermined number of markers belonging to each marker group input by the input receiving part 24.

In a case where a plurality of markers are first recognized, the marker recognition determination part 213 determines whether or not a plurality of markers, the number of which is the same as the number of all markers belonging to each of a plurality of marker groups input in advance by the input receiving part 24, are recognized.

In a case where a plurality of markers are first recognized, the marker arrangement determination part 214 determines whether or not a predetermined number of markers belonging to each of the first marker group and the second marker group are arranged according to a predetermined positional relationship. More specifically, in a case where the marker recognition determination part 213 determines that a plurality of markers, the number of which is the same as the number of all markers belonging to a plurality of input marker groups, are recognized, the marker arrangement determination part 214 determines whether or not a predetermined number of markers are arranged according to a predetermined positional relationship. For example, a plurality of markers are attached to a work area by a worker. For this reason, there is a possibility that a marker is attached in a wrong positional relationship due to an error of a worker. In this case, it is difficult to identify the first capturable area and the second capturable area. For example, in a case where a marker to be arranged at the upper left and a marker to be arranged at the lower left are interchanged, the marker arrangement determination part 214 determines that a predetermined number of markers are not arranged according to a predetermined positional relationship.

Identification information for identifying each marker is associated with a plurality of markers, and a predetermined arrangement position is associated with each piece of identification information. For this reason, when a plurality of markers are recognized, the marker arrangement determination part 214 identifies a coordinate position on an image of each of a plurality of recognized markers, identification information of each of a plurality of recognized markers, and an arrangement position associated with identification information of each of a plurality of recognized markers.

In a case where identification information of a plurality of recognized markers does not coincide with identification information of a predetermined number of markers belonging to a plurality of predetermined marker groups, the marker arrangement determination part 214 determines that a predetermined number of markers are not arranged according to a predetermined positional relationship. For example, in a case where two marker groups are used and there are three or more markers having the same identification information, the marker arrangement determination part 214 determines that a predetermined number of markers are not arranged according to a predetermined positional relationship.

Further, in a case where a positional relationship of arrangement positions of a plurality of recognized markers does not coincide with a positional relationship of predetermined arrangement positions, the marker arrangement determination part 214 determines that a predetermined number of markers are not arranged at predetermined positions. For example, in a case where an upper left marker is arranged at the lower left, the marker arrangement determination part 214 determines that a predetermined number of markers are not arranged according to a predetermined positional relationship.

Further, in a case where two marker groups are used, two quadrangular capturable areas are identified. For this reason, the marker arrangement determination part 214 may create a quadrangular area obtained by connecting an upper left marker, a lower left marker, an upper right marker, and a lower right marker by a straight line, and determine whether or not at least two quadrangular areas are created. In a case where at least two quadrangular areas are created, the marker arrangement determination part 214 may determine that a predetermined number of markers are arranged according to a predetermined positional relationship. Further, in a case where only one quadrangular area is created or in a case where no quadrangular area is created, the marker arrangement determination part 214 may determine that a predetermined number of markers are not arranged according to a predetermined positional relationship.

Further, a positional relationship of four markers belonging to one marker group is determined in advance. For this reason, the marker arrangement determination part 214 may determine that a predetermined number of markers are not arranged according to a predetermined positional relationship in a case where an upper right marker does not exist in a right direction of an upper left marker, a lower left marker does not exist in a lower direction of an upper left marker, or a lower right marker does not exist in a lower right direction of an upper left marker.

In a case where the marker arrangement determination part 214 determines that a predetermined number of markers are not arranged according to a predetermined positional relationship, the notification information output part 215 outputs notification information for notifying a worker that a positional relationship between a predetermined number of markers is incorrect. The notification information output part 215 creates notification information for notifying a worker that a positional relationship between a predetermined number of markers is incorrect, and outputs the created notification information to the display part 25.

The display part 25 is, for example, a liquid crystal display device. The display part 25 displays notification information for notifying a worker that a positional relationship between a predetermined number of markers is incorrect. For example, the display part 25 displays a text "Arrangement of markers is incorrect". A worker checks the notification information displayed on the display part 25 and arranges a marker incorrectly arranged at a correct position.

Note that in a case where the marker arrangement determination part 214 determines that a predetermined number of markers are not arranged according to a predetermined positional relationship, the notification information output part 215 may output notification information for notifying a worker of a marker that is not arranged according to a predetermined positional relationship. The notification information output part 215 may identify a marker that is not arranged according to a predetermined positional relationship. Then, the notification information output part 215 may create notification information for notifying a worker of a marker that is not arranged according to a predetermined positional relationship, and output the created notification information to the display part 25.

The display part 25 is, for example, a liquid crystal display device. The display part 25 may display notification information for notifying a worker of a marker that is not arranged according to a predetermined positional relationship. For example, the display part 25 may display a text "Arrangement of the lower left marker is incorrect". A worker checks the notification information displayed on the display part 25 and rearranges a marker arranged in an incorrect positional relationship so that the marker is in a correct positional relationship.

The distance calculation part 216 calculates a distance between a plurality of markers recognized by the marker recognition part 212.

The distance calculation part 216 calculates, for each of a plurality of marker groups, a distance between an upper left marker and at least one upper right marker in a right direction of the upper left marker, a distance between the upper left marker and at least one lower left marker in a lower direction of the upper left marker, a distance between a lower left marker and at least one lower right marker in a right direction of the lower left marker, and a distance between the upper right marker and at least one lower right marker in a lower direction of the upper right marker.

The area identification part 217 identifies the first capturable area surrounded by a predetermined number of markers belonging to the first marker group among a plurality of markers recognized by the marker recognition part 212 and the second capturable area surrounded by a predetermined number of markers belonging to the second marker group among a plurality of markers recognized by the marker recognition part 212 based on a distance calculated by the distance calculation part 216. The area identification part 217 identifies the first marker group including a predetermined number of markers between which a distance calculated by the distance calculation part 216 is equal to or less than a threshold and the second marker group including a predetermined number of markers between which a distance calculated by the distance calculation part 216 is equal to or less than a threshold. Further, in a case where a plurality of markers of the same type exist, the area identification part 217 identifies a marker at a closest distance from a reference marker as a marker belonging to the same marker group as the reference marker. Then, the area identification part 217 identifies the first capturable area surrounded by a predetermined number of markers belonging to the identified first marker group and the second capturable area surrounded by a predetermined number of markers belonging to the identified second marker group. Note that the threshold may be set in advance by a worker.

The mask image creation part 218 creates a mask image in which an area outside the first capturable area and the second capturable area in an image is masked. Note that the marker recognition part 212 may not be able to recognize a marker due to influence of illumination or the marker being outside a capturing range. In view of the above, in a case where both the first capturable area and the second capturable area are not identified by the area identification part 217, the mask image creation part 218 may create a mask image in which the entire image is masked. Further, in a case where one of the first capturable area and the second capturable area is identified by the area identification part 217, the mask image creation part 218 may create a mask image in which the outside of one of the first capturable area and the second capturable area is masked.

The mask image output part 219 outputs a mask image created by the mask image creation part 218. The mask image output part 219 outputs a mask image to the communication part 23. The communication part 23 transmits a mask image to the remote terminal 3.

The remote terminal 3 is, for example, a personal computer, a smartphone, or a tablet computer operated by a worker in a remote place. The remote terminal 3 receives a mask image transmitted by the image processing device 2. The remote terminal 3 displays the received mask image. The image processing device 2 transmits a mask image to the remote terminal 3 at a predetermined frame rate. For this reason, a moving image is transmitted from the image processing device 2 to the remote terminal 3.

A worker at a remote place can support work of a worker at a site while viewing a mask image displayed on the remote terminal 3. Note that the image processing device 2 and the remote terminal 3 may transmit and receive not only image data but also audio data to and from each other.

Figure 4:
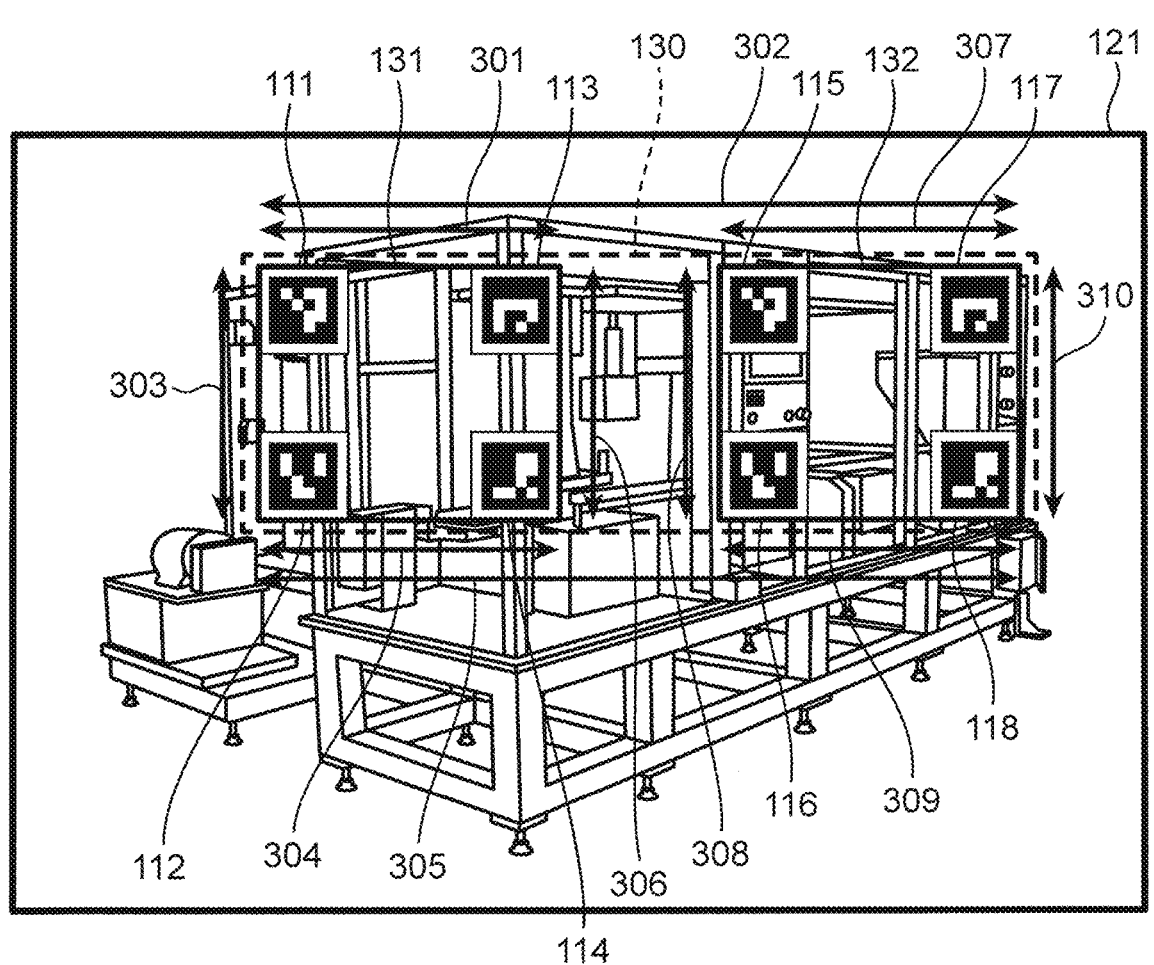
FIG. 4 is a diagram illustrating an example of an image captured by a camera so that two sets of marker groups appear in the present embodiment.

FIG. 4 is a diagram illustrating an example of an image 121 captured by the camera 1 in a manner that two marker groups appear in the present embodiment. Note that in FIG. 4, a marker is illustrated to be larger than an actual marker for easy understanding of description.

The image acquisition part 211 acquires the image 121 captured by the camera 1. The image 121 includes the first to eighth markers 111 to 118. The marker recognition part 212 recognizes the first marker 111 to the eighth marker 118 included in the image 121 acquired by the image acquisition part 211.

The distance calculation part 216 calculates a distance between each of the first marker 111 to the eighth marker 118 recognized by the marker recognition part 212.

Two markers, that is, the third marker 113 for the upper right and the seventh marker 117 for the upper right exist in the right direction of the first marker 111 for the upper left, and two markers, that is, the fourth marker 114 for the lower right and the eighth marker 118 for the lower right exist in the right direction of the second marker 112 for the lower left. For this reason, the distance calculation part 216 calculates a distance 301 between the first marker 111 for the upper left and the third marker 113 for the upper right in the right direction of the first marker 111 for the upper left, a distance 302 between the first marker 111 for the upper left and the seventh marker 117 for the upper right in the right direction of the first marker 111 for the upper left, a distance 303 between the first marker 111 for the upper left and the second marker 112 for the lower left in the right direction of the first marker 111 for the upper left, a distance 304 between the second marker 112 for the lower left and the fourth marker 114 for the lower right in the right direction of the second marker 112 for the lower left, a distance 305 between the second marker 112 for the lower left and the eighth marker 118 for the lower right in the right direction of the second marker 112 for the lower left, and a distance 306 between the third marker 113 for the upper right and the fourth marker 114 for the lower right in the lower direction of the third marker 113 for the upper right.

Further, the distance calculation part 216 calculates a distance 307 between the fifth marker 115 for the upper left and the seventh marker 117 for the upper right in the right direction of the fifth marker 115 for the upper left, a distance 308 between the fifth marker 115 for the upper left and the sixth marker 116 for the lower left in the lower direction of the fifth marker 115 for the upper left, a distance 309 between the sixth marker 116 for the lower left and the eighth marker 118 for the lower right in the right direction of the sixth marker 116 for the lower left, and a distance 310 between the seventh marker 117 for the upper right and the eighth marker 118 for the lower right in the lower direction of the seventh marker 117 for the upper right.

In a case where the first marker group and the second marker group are arranged in a horizontal direction, the distance calculation part 216 calculates the distance 301 between the first marker 111 and the third marker 113, the distance 302 between the first marker 111 and the seventh marker 117, the distance 303 between the first marker 111 and the second marker 112, the distance 304 between the second marker 112 and the fourth marker 114, the distance 305 between the second marker 112 and the eighth marker 118, the distance 306 between the third marker 113 and the fourth marker 114, the distance 307 between the fifth marker 115 and the seventh marker 117, the distance 308 between the fifth marker 115 and the sixth marker 116, the distance 309 between the sixth marker 116 and the eighth marker 118, and the distance 310 between the seventh marker 117 and the eighth marker 118.

Note that in a case where the first marker group and the second marker group are arranged in a vertical direction, the distance calculation part 216 calculates a distance between the first marker 111 and the third marker 113, a distance between the first marker 111 and the second marker 112, a distance between the first marker 111 and the sixth marker 116, a distance between the second marker 112 and the fourth marker 114, a distance between the third marker 113 and the fourth marker 114, a distance between the third marker 113 and the eighth marker 118, a distance between the fifth marker 115 and the seventh marker 117, a distance between the fifth marker 115 and the sixth marker 116, a distance between the sixth marker 116 and the eighth marker 118, and a distance between the seventh marker 117 and the eighth marker 118.

The area identification part 217 identifies the first marker group including the first marker 111 to the fourth marker 114 between which a distance calculated by the distance calculation part 216 is equal to or less than the threshold and the second marker group including the fifth marker 115 to the eighth marker 118 between which a distance calculated by the distance calculation part 216 is equal to or less than the threshold. Then, the area identification part 217 identifies a first capturable area 131 surrounded by the first marker 111 to the fourth marker 114 belonging to the identified first marker group and a second capturable area 132 surrounded by the fifth marker 115 to the eighth marker 118 belonging to the identified second marker group.

Here, there are not only the third marker 113 for the upper right but also the seventh marker 117 for the upper right on the right side of the first marker 111 for the upper left, and there are not only the fourth marker 114 for the lower right but also the eighth marker 118 for the lower right on the right side of the second marker 112 for the lower left. Therefore, conventionally, there has been a possibility that the area 130 surrounded by the first marker 111, the second marker 112, the seventh marker 117, and the eighth marker 118 is identified as a capturable area. In a case where the area 130 is identified as a capturable area, there has been a possibility that an area including confidential information between the first capturable area 131 and the second capturable area 132 is not masked, and a mask image including the confidential information is transmitted to the remote terminal 3.

However, in the present embodiment, the area identification part 217 identifies a combination of a predetermined number of markers in which a distance between each of a plurality of markers is equal to or less than the threshold. That is, the distance 301 between the first marker 111 and the third marker 113 is equal to or less than the threshold, but the distance 302 between the first marker 111 and the seventh marker 117 is longer than the threshold. Further, the distance 304 between the second marker 112 and the fourth marker 114 is equal to or less than the threshold, but the distance 305 between the second marker 112 and the eighth marker 118 is longer than the threshold. For this reason, an area surrounded by the first marker 111 to the fourth marker 114 is identified as the first capturable area 131, and an area surrounded by the fifth marker 115 to the eighth marker 118 is identified as the second capturable area 132, but the area 130 surrounded by the first marker 111, the second marker 112, the seventh marker 117, and the eighth marker 118 is not identified as a capturable area.

Further, even if both the distance 301 between the first marker 111 and the third marker 113 and the distance 302 between the first marker 111 and the seventh marker 117 are equal to or less than the threshold, the distance 301 is shorter than the distance 302, and the third marker 113 is identified as a marker belonging to the same marker group as the first marker 111. Further, even if both the distance 304 between the second marker 112 and the fourth marker 114 and the distance 305 between the second marker 112 and the eighth marker 118 are equal to or less than the threshold, the distance 304 is shorter than the distance 305, and the second marker 112 is identified as a marker belonging to the same marker group as the first marker 111.

In a case where there are the second marker 112 and the sixth marker 116 below the first marker 111, the area identification part 217 determines, as a marker belonging to the first marker group, the second marker 112 closer to the first marker 111 and having a distance from the first marker 111 equal to or less than the threshold. In a case where there are the third marker 113 and the seventh marker 117 on the right side of the first marker 111, the area identification part 217 determines, as a marker belonging to the first marker group, the third marker 113 closer to the first marker 111 and having a distance from the first marker 111 equal to or less than the threshold. Further, in a case where there are the fourth marker 114 and the eighth marker 118 on the right side of the second marker 112, the area identification part 217 determines, as a marker belonging to the first marker group, the fourth marker 114 closer to the second marker 112 and having a distance from the second marker 112 equal to or less than the threshold. In a case where there are the fourth marker 114 and the eighth marker 118 below the third marker 113, the area identification part 217 determines, as a marker belonging to the first marker group, the fourth marker 114 closer to the third marker 113 and having a distance from the third marker 113 equal to or less than the threshold.

Note that the first marker 111 to the fourth marker 114 are recognized as one marker group in a case of being positioned relatively at the upper left, the lower left, the upper right, and the lower right. For image processing, since a relative position is not known, processing for recognizing a relative position is required. In view of the above, processing below may be performed.

First, the area identification part 217 searches for an upper left marker to be a reference in a captured image. Note that a coordinate system of a captured image is represented by an x axis in which a coordinate value increases in the right direction from the origin and a y axis in which a coordinate value increases in a lower direction from the origin with an upper left corner of the captured image as the origin.

When an upper left marker is detected, the area identification part 217 searches for a lower left marker having a value larger than a y coordinate of the upper left marker. At this time, in a case where a plurality of lower left markers are detected, the area identification part 217 determines that a lower left marker closest to the upper left marker and having a distance from the upper left marker equal to or less than the threshold belongs to the same marker group as the upper left marker.

Next, the area identification part 217 searches for an upper right marker having a value larger than an x coordinate of the upper left marker. At this time, in a case where a plurality of upper right markers are detected, the area identification part 217 determines that an upper right marker closest to the upper left marker and having a distance from the upper left marker equal to or less than the threshold belongs to the same marker group as the upper left marker.

Next, the area identification part 217 searches for a lower right marker having a value larger than an x coordinate of the lower left marker and a value larger than a y coordinate of the upper right marker. At this time, in a case where a plurality of lower right markers are detected, the area identification part 217 determines that a lower right marker closest to the lower left marker, closest to the upper right marker, having a distance to the lower left marker being equal to or less than the threshold, and having a distance to the upper right marker being equal to or less than the threshold belongs to the same marker group as the upper left marker.

By the above processing, one marker group including four markers is identified. When one marker group is identified, the area identification part 217 further searches for an upper left marker in the captured image, and the above processing is repeated until all upper left markers are detected.

In a case where the first marker group including the first marker 111 to the fourth marker 114 is identified, the area identification part 217 identifies the first capturable area 131 obtained by connecting, by a straight line, an upper left vertex of the upper left first marker 111, a lower left vertex of the lower left second marker 112, an upper right vertex of the upper right third marker 113, and a lower right vertex of the lower right fourth marker 114. Further, in a case where the second marker group including the fifth marker 115 to the eighth marker 118 is identified, the area identification part 217 identifies the second capturable area 132 obtained by connecting, by a straight line, an upper left vertex of the upper left fifth marker 115, a lower left vertex of the lower left sixth marker 116, an upper right vertex of the upper right seventh marker 117, and a lower right vertex of the lower right eighth marker 118.

Note that in a case where four markers are identified as one marker group, the area identification part 217 may identify a capturable area obtained by connecting, by a straight line, a lower right vertex of an upper left marker, an upper right vertex of a lower left marker, a lower left vertex of an upper right marker, and an upper left vertex of a lower right marker. Further, in a case where four markers are identified as one marker group, the area identification part 217 may identify a capturable area obtained by connecting, by a straight line, center points of the four markers.

Figure 5:
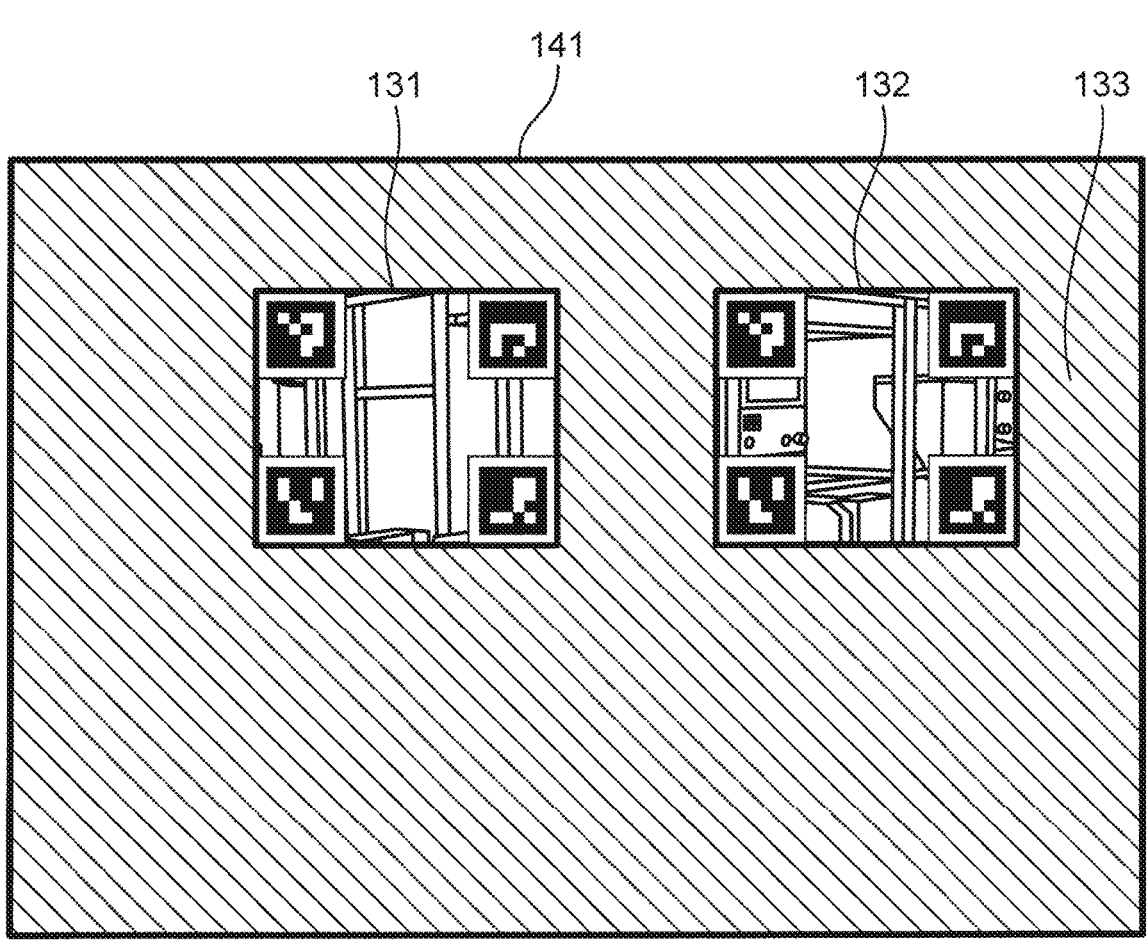
FIG. 5 is a diagram illustrating an example of a mask image created based on the image illustrated in FIG. 4 in the present embodiment.

FIG. 5 is a diagram illustrating an example of a mask image 141 created based on the image 121 illustrated in FIG. 4 in the present embodiment.

The mask image creation part 218 creates the mask image 141 in which an area 133 outside the first capturable area 131 and the second capturable area 132 in the image 121 is masked. The mask image creation part 218 performs mask processing on the area 133 outside the first capturable area 131 and the second capturable area 132 in the image 121. The mask processing may be, for example, processing of filling the area 133 with a predetermined color such as black, white, or gray, processing of applying blurring processing to the area 133, or processing of applying mosaic processing to the area 133. In the mask image 141 illustrated in FIG. 5, a capturable image in the first capturable area 131 and the second capturable area 132 are visually recognizable, and the area 133 other than the first capturable area 131 and the second capturable area 132 is concealed.

Note that, in the present embodiment, the image processing device 2 is arranged on site, but the present disclosure is not particularly limited to this, and the image processing device 2 may be a server provided on a cloud. In this case, the image processing device 2 is connected to the camera 1 via the network 4 so as to be able to communicate with each other.

Next, work support processing by the image processing device 2 according to the embodiment of the present disclosure will be described.

Figure 6:
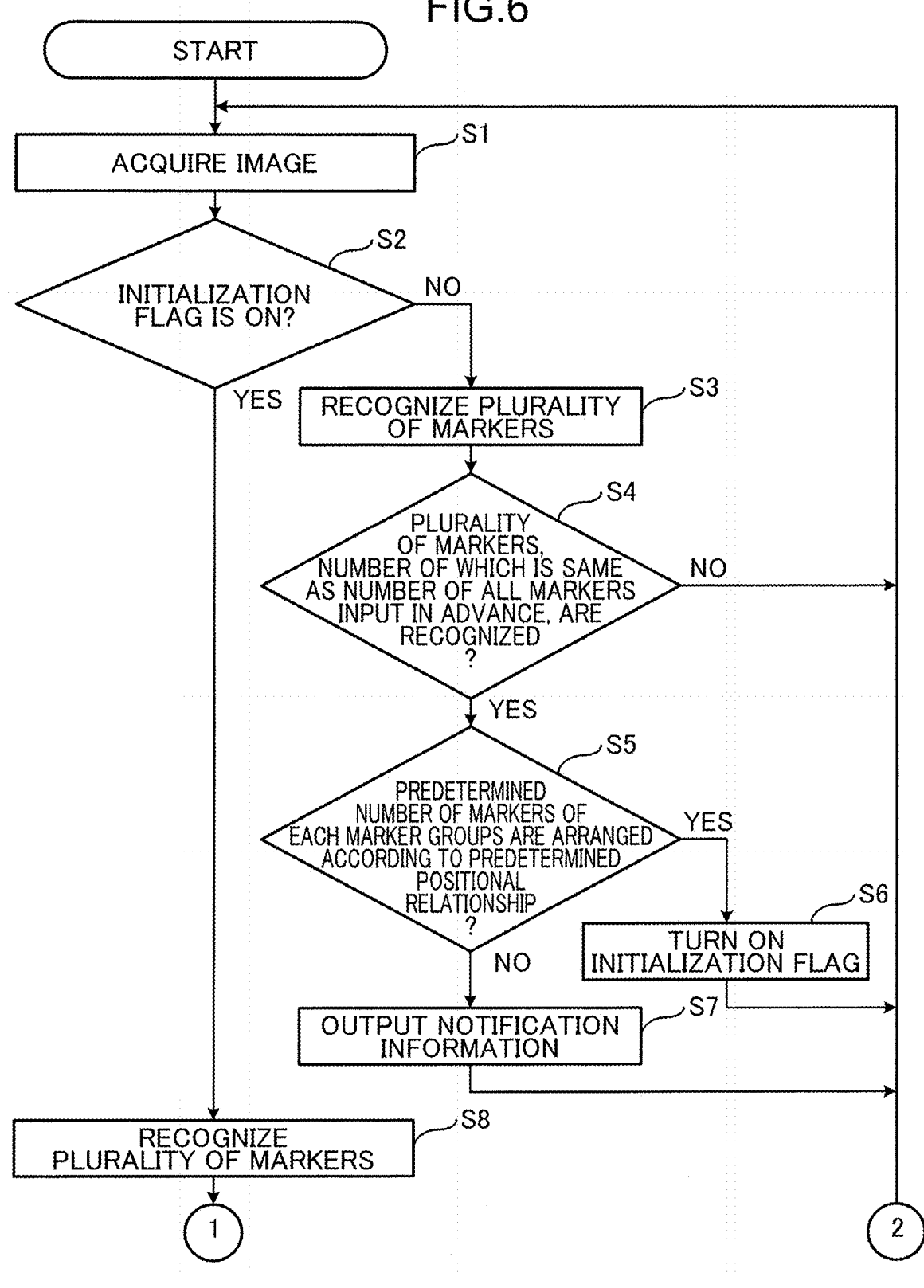
FIG. 6 is a first flowchart for explaining work support processing by the image processing device according to an embodiment of the present disclosure.
Figure 7:
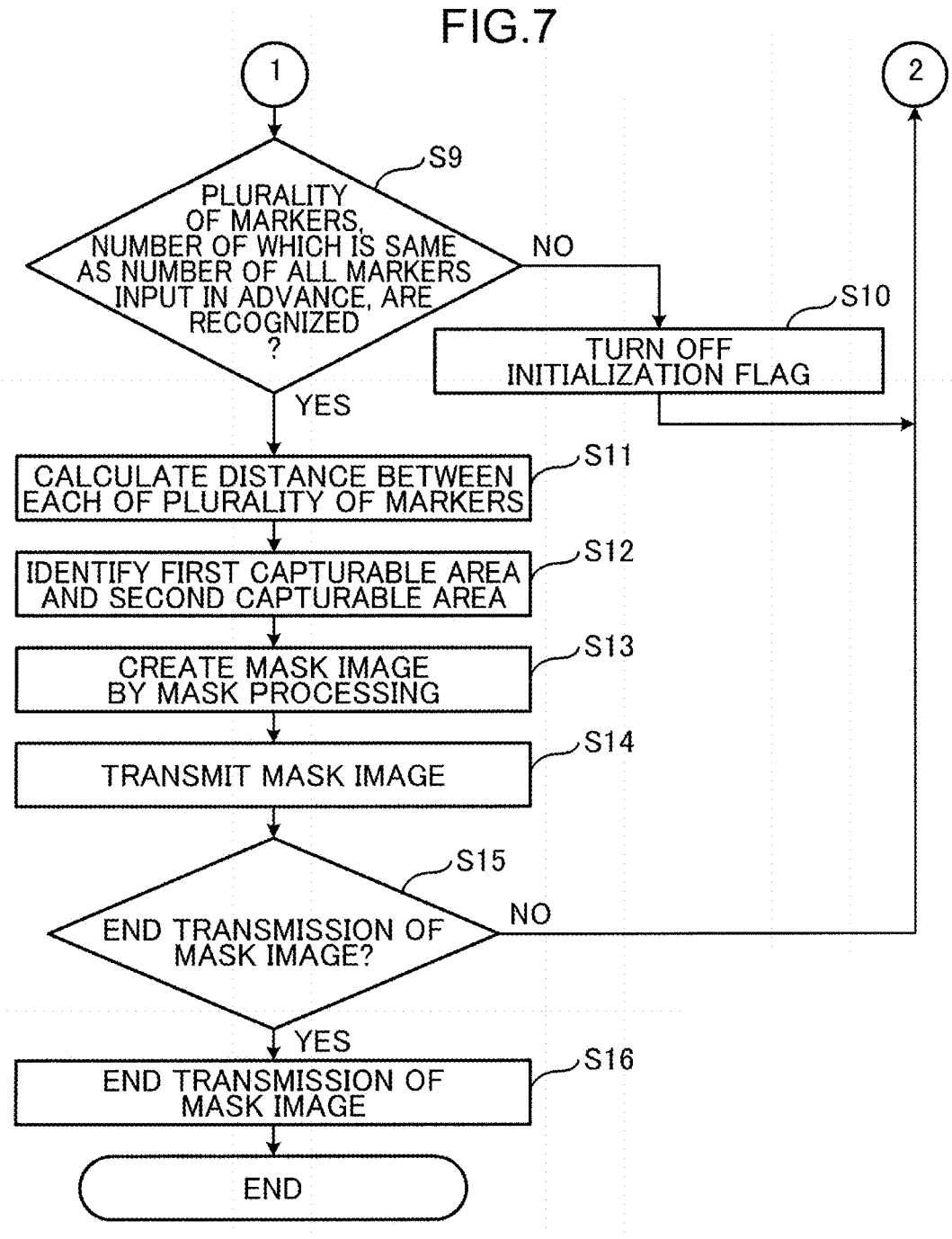
FIG. 7 is a second flowchart for explaining the work support processing by the image processing device according to the embodiment of the present disclosure.

FIG. 6 is a first flowchart for explaining work support processing by the image processing device 2 according to the embodiment of the present disclosure, and FIG. 7 is a second flowchart for explaining the work support processing by the image processing device 2 according to the embodiment of the present disclosure.

First, in Step S1, the image acquisition part 211 acquires an image captured by the camera 1. Note that in a case where the camera 1 is powered on or in a case where a button for starting transmission of a mask image provided in the image processing device 2 is pressed, an image is acquired from the camera 1.

Next, in Step S2, the marker recognition part 212 determines whether or not an initialization flag stored in the memory 22 is on. Here, in a case where the initialization flag is not on, that is, the initialization flag is determined to be off (NO in Step S2), in Step S3, the marker recognition part 212 recognizes a plurality of markers included in an image acquired by the image acquisition part 211.

Next, in Step S4, the marker recognition determination part 213 determines whether or not a plurality of markers, the number of which is the same as the number of all markers belonging to each of a plurality of marker groups input in advance by the input receiving part 24, are recognized. Here, in a case where a plurality of markers, the number of which is the same as the number of all markers belonging to each of a plurality of marker groups input in advance, are determined not to be recognized (NO in Step S4), the processing returns to Step S1. In the present embodiment, two marker groups are used, and one marker group includes four markers. Therefore, the marker recognition determination part 213 determines whether or not eight markers are recognized.

On the other hand, in a case where a plurality of markers, the number of which is the same as the number of all markers belonging to each of a plurality of marker groups input in advance, are determined to be recognized (YES in Step S4), in Step S5, the marker arrangement determination part 214 determines whether or not a predetermined number of markers of each marker groups are arranged according to a predetermined positional relationship. Here, in a case where a predetermined number of markers of each marker group are determined to be arranged according to a predetermined positional relationship (YES in Step S5), the marker arrangement determination part 214 turns on an initialization flag stored in the memory 22 in Step S6. After the initialization flag is turned on, the processing returns to Step S1.

On the other hand, in a case where a predetermined number of markers of each marker group are determined not to be arranged according to a predetermined positional relationship (NO in Step S5), in Step S7, the notification information output part 215 outputs notification information for notifying a worker that a positional relationship between a predetermined number of markers is incorrect to the display part 25. The display part 25 displays notification information for notifying a worker that a positional relationship between a predetermined number of markers is incorrect. After display information is output, the processing returns to Step S1.

On the other hand, in a case where the initialization flag is determined to be on (YES in Step S2), in Step S8, the marker recognition part 212 recognizes a plurality of markers included in the image acquired by the image acquisition part 211.

Next, in Step S9, the marker recognition determination part 213 determines whether or not a plurality of markers, the number of which is the same as the number of all markers belonging to each of a plurality of marker groups input in advance by the input receiving part 24, are recognized. Note that the processing in Step S9 is the same as the processing in Step S4. Here, in a case where a plurality of markers, the number of which is the same as the number of all markers belonging to each of a plurality of marker groups input in advance, are determined not to be recognized (NO in Step S9), the marker recognition determination part 213 turns off the initialization flag stored in the memory 22 in Step S10. After the initialization flag is turned off, the processing returns to Step S1.

On the other hand, in a case where a plurality of markers, the number of which is the same as the number of all markers belonging to each of a plurality of marker groups input in advance, are determined to be recognized (YES in Step S9), in Step S11, the distance calculation part 216 calculates a distance between each of a plurality of markers recognized by the marker recognition part 212.

Next, in Step S12, the area identification part 217 identifies the first capturable area surrounded by a predetermined number of markers belonging to the first marker group and the second capturable area surrounded by a predetermined number of markers belonging to the second marker group based on a distance between a plurality of markers calculated by the distance calculation part 216. The area identification part 217 identifies the first capturable area surrounded by four markers belonging to the first marker group among eight markers recognized by the marker recognition part 212 and the second capturable area surrounded by four markers belonging to the second marker group among eight markers recognized by the marker recognition part 212.

At this time, the area identification part 217 identifies the first marker group including the first marker 111 to the fourth marker 114 between which a distance calculated by the distance calculation part 216 is equal to or less than the threshold and the second marker group including the fifth marker 115 to the eighth marker 118 between which a distance calculated by the distance calculation part 216 is equal to or less than the threshold. Then, the area identification part 217 identifies a first capturable area 131 surrounded by the first marker 111 to the fourth marker 114 belonging to the identified first marker group and a second capturable area 132 surrounded by the fifth marker 115 to the eighth marker 118 belonging to the identified second marker group.

Next, in Step S13, the mask image creation part 218 creates a mask image by mask processing of masking an area outside the first capturable area and the second capturable area identified by the area identification part 217 in the image.

Next, in Step S14, the mask image output part 219 transmits the mask image created by the mask image creation part 218 to the remote terminal 3 via the communication part 23. The remote terminal 3 receives a mask image transmitted by the image processing device 2. The remote terminal 3 displays the received mask image.

Next, in Step S15, the mask image output part 219 determines whether or not to end the transmission of a mask image. Note that, in a case where power of the camera 1 is turned off, or in a case where a button for ending transmission of ae mask image provided in the image processing device 2 is pressed, the transmission of a mask image ends.

Here, in a case where the transmission of a mask image is determined to be ended (YES in Step S15), the mask image output part 219 ends the transmission of ae mask image in Step S16.

On the other hand, in a case where the transmission of a mask image is determined not to be ended (NO in Step S15), the processing returns to Step S1.

As described above, in a case where a plurality of markers included in an image are recognized, a distance between each of a plurality of recognized markers is calculated. Then, based on the calculated distance, the first capturable area surrounded by a predetermined number of markers belonging to the first marker group among a plurality of recognized markers and the second capturable area surrounded by a predetermined number of markers belonging to the second marker group among a plurality of recognized markers are identified. Then, a mask image in which an area outside the first capturable area and the second capturable area in the image is masked is created, and the mask image is output.

Therefore, even in a case where a plurality of capturable areas are set, each of a plurality of capturable areas is identified, so that it is possible to output an image in which an area other than a plurality of capturable areas is appropriately masked. That is, it is possible to prevent the first capturable area and the second capturable area from being erroneously identified as one capturable area, and to prevent an image including confidential information in one capturable area that is erroneously identified from being output. As a result, a worker in a site can receive efficient work support from a worker in a remote place.

Note that, in the present embodiment, the input receiving part 24 receives input of the number of marker groups to be used and the number of a predetermined number of markers belonging to each marker group by a worker, and the marker recognition determination part 213 determines whether or not a plurality of markers, the number of which is the same as the number of all markers belonging to each of a plurality of marker groups input in advance by the input receiving part 24, are recognized in a case where a plurality of markers are first recognized, but the present disclosure is not particularly limited to this. After the processing in Step S3 of FIG. 6 is performed, the display part 25 may present an image acquired by the image acquisition part 211 to a worker in a case where a plurality of markers are first recognized.

At this time, the display part 25 displays a plurality of recognized markers so that a plurality of recognized markers can be identified. For example, the display part 25 may display each of a plurality of recognized markers in a manner surrounding each of a plurality of recognized markers with a line of a predetermined color. The input receiving part 24 may receive input by a worker as to whether or not all markers belonging to a plurality of marker groups are recognized in an image. The input receiving part 24 includes a first button for inputting that all markers belonging to a plurality of marker groups are recognized in an image, and a second button for inputting that all markers belonging to a plurality of marker groups are not recognized in the image. A worker visually checks whether or not all markers belonging to a plurality of marker groups are recognized in a displayed image. A worker presses the first button when all markers belonging to a plurality of marker groups are recognized, and presses the second button when all markers belonging to a plurality of marker groups are not recognized.

Note that the first button and the second button may be displayed on the display part 25. A worker may move a cursor on a screen onto the first button or the second button by using a mouse and click the button. Further, in a case where the display part 25 is a touch panel, a worker may touch either the first button or the second button on a screen.

Then, in a case where a worker inputs that all markers belonging to all marker groups are recognized, the marker arrangement determination part 214 may determine whether a predetermined number of markers are arranged according to a predetermined positional relationship (processing of Step S5). On the other hand, in a case where a worker inputs that all markers belonging to all marker groups are not recognized, the processing returns to Step S1.

Note that, in each of the above embodiments, each constituent element may be implemented by including dedicated hardware or by executing a software program suitable for each constituent element. Each constituent element may be implemented by a program execution part, such as a CPU or a processor, reading and executing a software program recorded in a recording medium such as a hard disk or a semiconductor memory. Further, a program may be recorded onto a recording medium and transferred or transferred via a network, so that the program is performed by another independent computer system.

Some or all functions of the device according to the embodiment of the present disclosure are implemented as large scale integration (LSI), which is typically an integrated circuit. These may be individually integrated into one chip, or may be integrated into one chip so as to include some or all of these. Further, circuit integration is not limited to LSI, and may be implemented by a dedicated circuit or a general-purpose processor. A field programmable gate array (FPGA), which can be programmed after manufacturing of LSI, or a reconfigurable processor in which connection and setting of circuit cells inside LSI can be reconfigured may be used.

Further, some or all functions of the devices according to the embodiments of the present disclosure may be realized by a processor such as a CPU executing a program.

Further, all numbers used above are illustrated to specifically describe the present disclosure, and the present disclosure is not limited to the illustrated numbers.

Further, order in which steps illustrated in the above flowchart are executed is for specifically describing the present disclosure, and may be any order other than the above order as long as a similar effect is obtained. Further, some of the above steps may be executed simultaneously (in parallel) with other steps.

A technique according to the present disclosure can output an image in which an area other than a plurality of capturable areas is appropriately masked even in a case where a plurality of capturable areas is set, and thus is useful as a technique of masking an area other than a plurality of capturable areas in an image.

The invention claimed is:

1. An information processing method in a computer, the information processing method comprising:
acquiring an image captured by a camera;
recognizing a plurality of markers included in the image;
calculating a distance between each of the plurality of markers that are recognized;
identifying a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated;
creating a mask image in which an area outside the first capturable area and the second capturable area in the image is masked; and
outputting the mask image.

2. The information processing method according to claim 1, wherein in identifying the first capturable area and the second capturable area, the first marker group including the predetermined number of markers between which the distance is equal to or less than a threshold and the second marker group including the predetermined number of markers between which the distance is equal to or less than a threshold are identified.

3. The information processing method according to claim 1, wherein in identifying the first capturable area and the second capturable area, in a case where a plurality of markers of a same type exist, a marker with the distance closest from a marker as a reference is identified as a marker belonging to a same marker group as the marker as the reference.

4. The information processing method according to claim 1, wherein
a positional relationship between the predetermined number of markers belonging to each of the first marker group and the second marker group is determined in advance, and the information processing method further comprises:
determining whether or not the predetermined number of markers are arranged according to the positional relationship determined in advance in a case of recognizing the plurality of markers first; and
outputting notification information for notifying a worker that a positional relationship between the predetermined number of markers is incorrect in a case of determining that the predetermined number of markers are not arranged according to the positional relationship determined in advance.

5. The information processing method according to claim 1, wherein
a positional relationship between the predetermined number of markers belonging to each of the first marker group and the second marker group is determined in advance, and
the information processing method further comprises:
determining whether or not the predetermined number of markers are arranged according to the positional relationship determined in advance in a case of recognizing the plurality of markers first; and
outputting notification information for notifying a worker of a marker not arranged according to the positional relationship determined in advance in a case of determining that the predetermined number of markers are not arranged according to the positional relationship determined in advance.

6. The information processing method according to claim 4, further comprising:
receiving input by the worker about a number of a plurality of marker groups to be used and a number of the predetermined number of markers belonging to each marker group; and
determining whether or not the plurality of markers, a number of which is same as a number of all markers belonging to the plurality of marker groups that are input, are recognized in a case of recognizing the plurality of markers first,
wherein in determining whether or not the predetermined number of markers are arranged according to the positional relationship determined in advance, in a case where the plurality of markers, a number of which is same as a number of all markers belonging to each of the plurality of marker groups that are input, are determined to be recognized, whether or not the predetermined number of markers are arranged according to the positional relationship determined in advance is determined.

7. The information processing method according to claim 4, further comprising:
presenting the image that is acquired to the worker in a case where the plurality of markers are first recognized; and
receiving input by the worker as to whether or not all markers belonging to a plurality of marker groups are recognized in the image,
wherein in determining whether or not the predetermined number of markers are arranged according to the positional relationship determined in advance, in a case where the worker inputs that all the markers belonging to the marker groups are recognized, whether or not the predetermined number of markers are arranged according to the positional relationship determined in advance is determined.

8. The information processing method according to claim 1, wherein the predetermined number of markers belonging to the first marker group include a first marker arranged at an upper left position, a second marker arranged at a lower left position, a third marker arranged at an upper right position, and a fourth marker arranged at a lower right position in a first work area that is capturable in a work space, and the predetermined number of markers belonging to the second marker group include a fifth marker arranged at an upper left position, a sixth marker arranged at a lower left position, a seventh marker arranged at an upper right position, and an eighth marker arranged at a lower right position in a second work area that is capturable in the work space.

9. The information processing method according to claim 8, wherein in identifying the first capturable area and the second capturable area, in a case where there are the second marker and the sixth marker below the first marker, the second marker closer to the first marker and with a distance to the first marker equal to or less than a threshold is determined as a marker belonging to the first marker group, in a case where there are the third marker and the seventh marker on a right side of the first marker, the third marker closer to the first marker and with a distance to the first marker equal to or less than a threshold is determined as a marker belonging to the first marker group, in a case where there are the fourth marker and the eighth marker on the right side of the second marker, the fourth marker closer to the second marker and with a distance to the second marker equal to or less than a threshold is determined as a marker belonging to the first marker group, and in a case where there are the fourth marker and the eighth marker below the third marker, the fourth marker closer to the third marker and with a distance to the third marker equal to or less than a threshold is determined as a marker belonging to the first marker group.

10. An information processing device comprising:

an acquisition part that acquires an image captured by a camera;

a recognition part that recognizes a plurality of markers included in the image;

a calculation part that calculates a distance between each of the plurality of markers that are recognized;

an identification part that identifies a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated;

a creation part that creates a mask image in which an area outside the first capturable area and the second capturable area in the image is masked; and an output part that outputs the mask image.

11. A non-transitory computer readable recording medium storing an information processing program that causes a computer to function to:

acquire an image captured by a camera;

recognize a plurality of markers included in the image;

calculate a distance between each of the plurality of markers that are recognized;

identify a first capturable area surrounded by a predetermined number of markers belonging to a first marker group among the plurality of markers that are recognized and a second capturable area surrounded by a predetermined number of markers belonging to a second marker group among the plurality of markers that are recognized based on the distance that is calculated;

create a mask image in which an area outside the first capturable area and the second capturable area in the image is masked; and output the mask image.

* * * * *